United States Patent
Kruempelmann et al.

(10) Patent No.: US 8,572,156 B2
(45) Date of Patent: Oct. 29, 2013

(54) ENHANCED CONNECTIVITY IN DISTRIBUTED COMPUTING SYSTEMS

(75) Inventors: Wulf Kruempelmann, Altlussheim (DE); Thomas Brodkorb, Wiesloch (DE)

(73) Assignee: SAP AG, Walldorf (DE)

( * ) Notice: Subject to any disclaimer, the term of this patent is extended or adjusted under 35 U.S.C. 154(b) by 280 days.

(21) Appl. No.: 12/965,238

(22) Filed: Dec. 10, 2010

(65) Prior Publication Data

US 2012/0150940 A1    Jun. 14, 2012

(51) Int. Cl.
*G06F 15/16* (2006.01)
(52) U.S. Cl.
USPC .......................................... 709/201; 709/220
(58) Field of Classification Search
USPC .......................................... 709/203, 201, 220
See application file for complete search history.

(56) References Cited

U.S. PATENT DOCUMENTS

| | | | | |
|---|---|---|---|---|
| 8,209,732 B2 * | 6/2012 | Le et al. | | 725/107 |
| 2002/0032797 A1 * | 3/2002 | Xu | | 709/238 |
| 2002/0038339 A1 * | 3/2002 | Xu | | 709/203 |
| 2007/0216761 A1 * | 9/2007 | Gronner et al. | | 348/14.02 |
| 2009/0172101 A1 * | 7/2009 | Arthursson | | 709/205 |
| 2009/0300148 A1 * | 12/2009 | Gomes | | 709/220 |

* cited by examiner

*Primary Examiner* — David Lazaro
*Assistant Examiner* — Marie Georges Henry
(74) *Attorney, Agent, or Firm* — Mintz, Levin, Cohn, Ferris, Glovsky and Popeo, P.C.

(57) ABSTRACT

Techniques are provided for exchanging configuration settings in a distributed software system in which interrelated software processes execute on both a client system and a service provider. Automation scripts are generated and used by the client system and the service provider to establish and initiate respective test environments. Related apparatus, systems, techniques and articles are also described.

20 Claims, 5 Drawing Sheets

ENHANCED CONNECTIVITY IN DISTRIBUTED COMPUTING SYSTEMS

TECHNICAL FIELD

The subject matter described herein relates to techniques and systems for enhancing connectivity for networked solutions utilized by distributed computing systems.

BACKGROUND

Companies are increasingly adopting computing environments in which software (e.g., client applications, ERP systems, etc.) resides locally on one or more client systems and such software interacts with remote servers (e.g., service providers, cloud computing systems, etc.) executing software managed by a different organization. In such distributed software environments, the connections among the various systems need to be managed by the IT organizations in each respective company. However, in such situations, each organization only controls a portion of the overall distributed software system and so the respective IT organizations need to coordinate any changes that are being made which might impact the functionality of the local and/or remote software. Such changes, which are sometimes referred to as configuration settings, are often conveyed in an ad-hoc basis as each IT organization has its own practices in this regard.

SUMMARY

In one aspect, methods, systems, apparatus, and techniques are provided for exchanging configuration settings in a distributed software system in which interrelated software processes execute on both a client system and a service provider. Generation of a test environment is initiated at the service provider for the client system. The test environment at the service provider interacts with a test environment at the client system. Thereafter, technical data associated with the test environment at the service provider is fetched by the service provider. In addition, automation scripts are generated by the service provider using the fetched technical data. These automation scripts are for the service provider and the client system that respectively define configuration settings for the service provider and the client system. Automation scripts for the service provider are then executed at the service provider. The automation scripts for the client system are transmitted by the service provider to the client system. Testing of the test environment at both the service provider and the client system can be initiated once the automation scripts have been executed on both the service provider and the client system.

The scripts executed on the client system can be operated under the control of the service provider. Placeholders utilized by the test environment of the service provider and/or placeholders utilized by the test environment of the client system can be replaced by the automation scripts.

Additional data complementary to the transmitted automation scripts can be transmitted by the service provider to the client system. The additional data can comprise one or more of: plug-in modules, business process information, and/or automated tests to execute in the test environment of the client system. Upon initiation of the automation script by the client system, the client system can check requirements, installs plug-ins if needed, generate data destinations for the test environment of the client system, and/or automatically test the generated data destinations.

The client system can generate a log of actions that take place and data that is transmitted from the test environment of the client system to the test environment of the service provider. The service provider can generate a log of actions that take place and data that is transmitted from the test environment of the service provider to the test environment of the client system. The service provider can also fetch technical data from the client system. The technical data fetched from the client system can include: firewall information, system identification, host information, and/or user information. The automation scripts can be XML schemas.

In another aspect, a system is provided that includes a service provider and a client system. The service provider provides one or more networked software solutions and that comprises one or more servers, each server including at least one data processor and memory. The client system is remote from the service provider and consumes one or more networked software solutions of the service provider. In addition, the client system comprises one or more servers with each server including at least one data processor and memory. With such an arrangement, generation of a test environment is initiated at the service provider for the client system, the test environment at the service provider to interact with a test environment at the client system; technical data associated with the test environment is fetched by the service provider; automation scripts for the service provider and the client system are generated using the fetched technical data, the automation scripts respectively defining configuration settings for the service provider and the client system; the automation scripts for the service provider are executed; the automation scripts are transmitted by the service provider to the client system; and testing of the test environment at the service provider and the test environment at the client system is initiated once the automation scripts have been executed on both the service provider and the client system.

Articles of manufacture are also described that comprise computer executable instructions permanently (e.g., non-transitorily, etc.) stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. Methods described herein can be implemented by one or more data processors such that the operations are in turn each implemented by at least one data processor.

The subject matter described herein provides many advantages. For example, the current subject matter automates connectivity among various servers participating in a distributed software system. This automated connectivity, in turn, reduces the total cost of ownership of such systems by reducing the burden on IT professionals when changes are made to the overall distributed software system.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
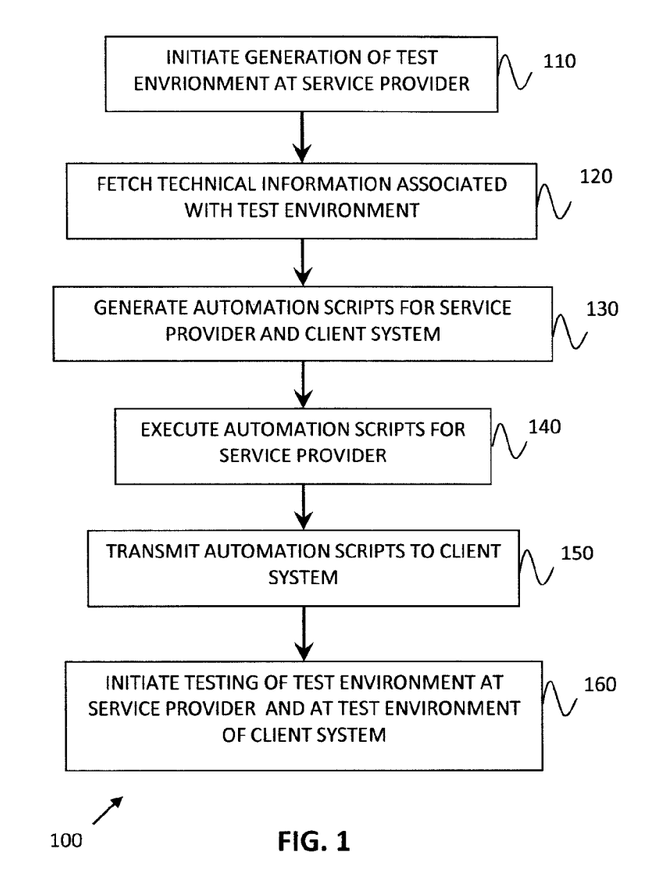
FIG. 1 is a process flow diagram illustrating a method for exchanging configuration settings in a distributed software system in which interrelated software processes execute on both a client system and a service provider.

FIG. 1 is a process flow diagram illustrating a method 100 for exchanging configuration settings in a distributed software system in which interrelated software processes execute on both a client system and a service provider. Generation of a test environment at the service provider is, at 110, initiated at the service provider for the client system. The test environment at the service provider to interact with a test environment at the client system. The service provider, at 120, fetches technical data associated with the test environment at the service provider. Automation scripts for the service provider and the client system are generated, at 130, by the service provider using the fetched technical data. These automation scripts respectively define configuration settings for the service provider and the client system. Thereafter, at 140, the automation scripts are executed for the service provider at the service provider. In addition, at 150, the automation scripts for the client system are transmitted by the service provider to the client system. The testing of the test environment at both the service provider and the client system can then, at 160, be initiated at the service provider once the automation scripts have been executed on both the service provider and the client system.

Figure 2:
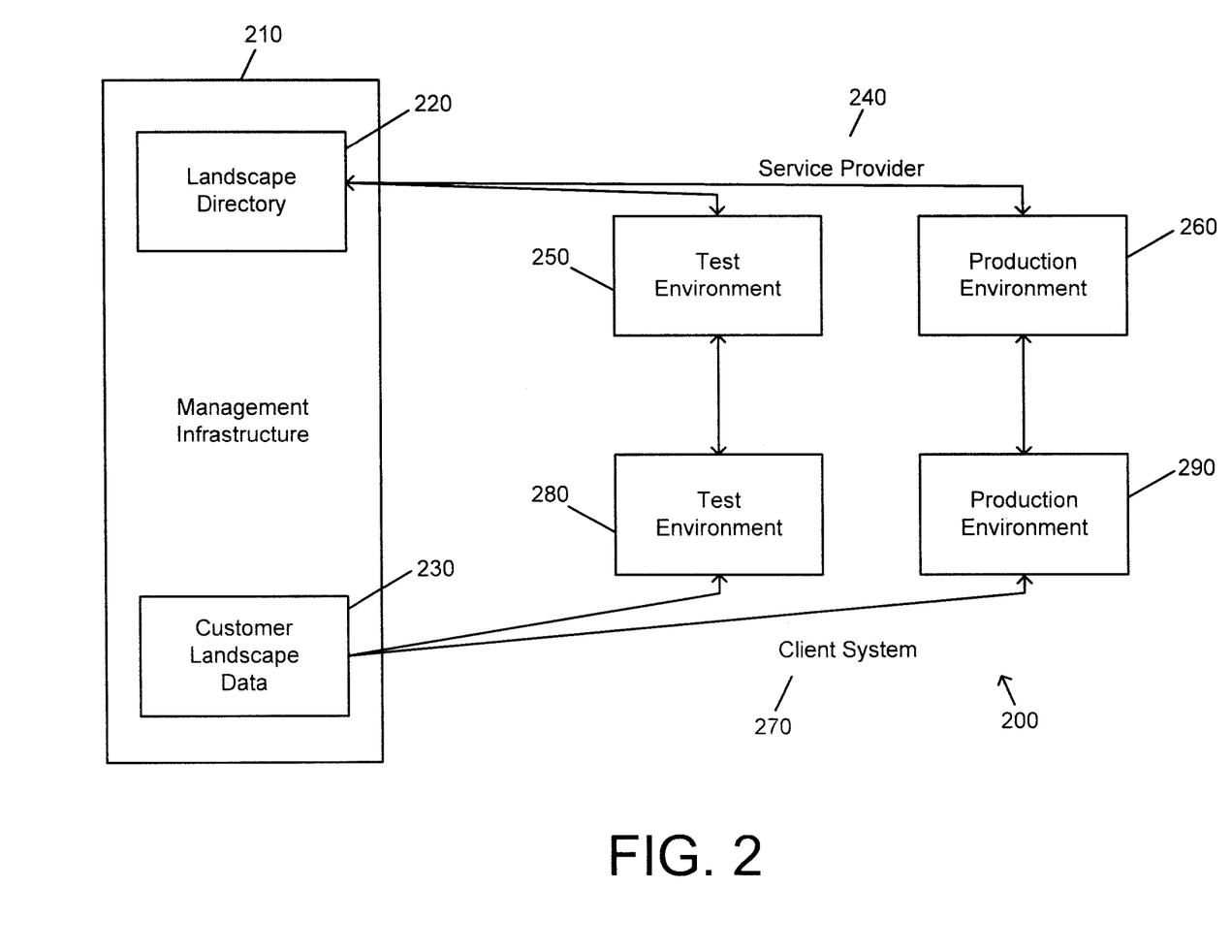
FIG. 2 is a diagram illustrating a system landscape including a management infrastructure interacting with a service provider and a client system.

FIG. 2 is a system diagram illustrating a system landscape 200 that includes a management infrastructure 210. The management infrastructure 210 includes a landscape directory 220 which provides information regarding the various components/server which form part of the landscape such as connection and status information. The management infrastructure 210 also includes customer landscape data 230 which is used by a client system 270 (which can include one or more servers executing client applications). The management infrastructure 220 is in communication with a test environment 250 and a production environment 260 of a service provider 240 (which can include one or more servers executing service provider applications) as well as a test environment 280 and a production environment 290 of the client system 270. The test environments 250, 280 are respectively utilized by the service provider 240 and the client system 270 to test certain changes to a distributed software system prior to those changes being made available on the respective production environments 260, 290. It will be appreciated that the management infrastructure 210 and/or the service provider 240 can be coupled to a plurality of client systems 270 each having differing customer landscape configurations and data. In addition, it will also be appreciated that each of the service provider 240 and the client system 270 can have separate management infrastructures instead of the shared management infrastructure 210 as illustrated in FIG. 2.

Figure 3:
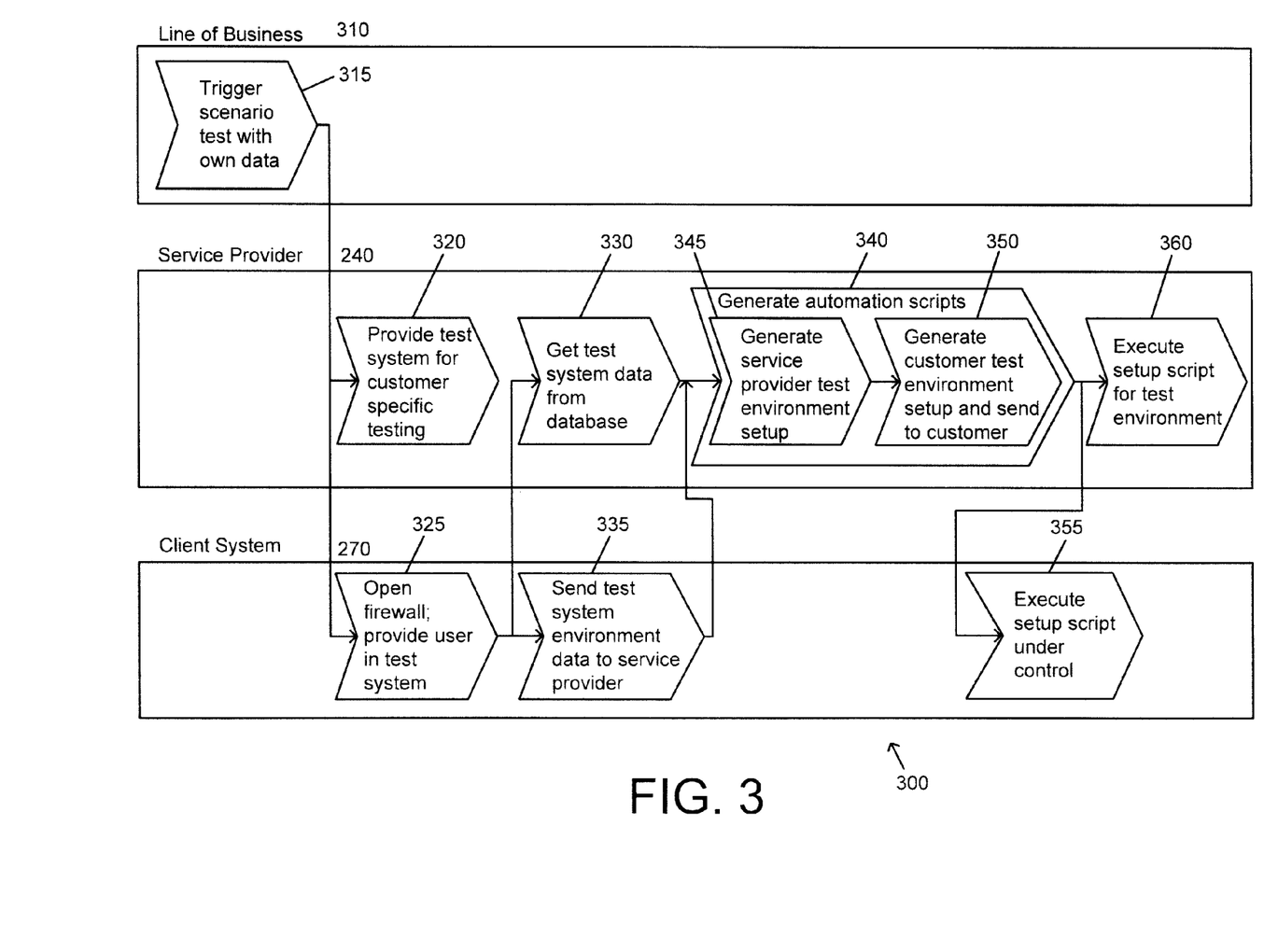
FIG. 3 is a diagram illustrating a sample setup process.

FIG. 3 is a process flow diagram 300 illustrating a sample setup process among a line of business 310, a service provider 240 and a client system 270. The line of business 310 (i.e., the group of users of the customer that use the business process such as a salesman working with sales process, etc.) at 315 can receive an order to create a test environment in which new business processes can be developed and tested. In response, the service provider 240, at 320, can provide a test system (e.g., test environment 250, etc.) for customer specific settings (corresponding to the client system 270). The client system 270, at 325, can provide access by opening a firewall and additionally providing user information for the test system to the service provider 240. The service provider 240 then, at 330, can fetch technical system data for the service provider test environment 250 from, for example, a remote database. Similarly, the client system, at 270, can send (or the service provider 240 can fetch) corresponding test environment data (characterizing the client system test environment 280 such as firewall, system, host, user, etc) to the service provider 240. Thereafter, the service provider 240 can generate automation scripts 340 to effect the implementation of configuration settings at the service provider 240 and the client system 270 (without user intervention in either IT department) to enable initiation of the test environments 250, 280. Generation of the automation scripts 340 can include, at 345, generating service provider test environment setup settings and, at 350, generating client system test environment settings and sending same to the client system 270. Once the automation scripts 340 are generated, the service provider 240 can execute a setup script (which is one of the generated automation scripts 340) for the service provider test environment 250. In addition, under the control of the service provider 240, the client system 270 can execute a setup script for the client system test environment 280. Execution of the scripts can cause any placeholder settings to be modified or removed. In addition, in some implementations the service provider 240 can also send data in addition to the setup script such as a plug-in module, business process information, as well as automated tests to execute in the client system test environment 280. At the client system 270, at the execution of the startup script, the client system 270 can check requirements, install a plugin (if required), generate data destinations required by the test environment 280 and/or execute automated tests of the generated data destinations.

Figure 4:
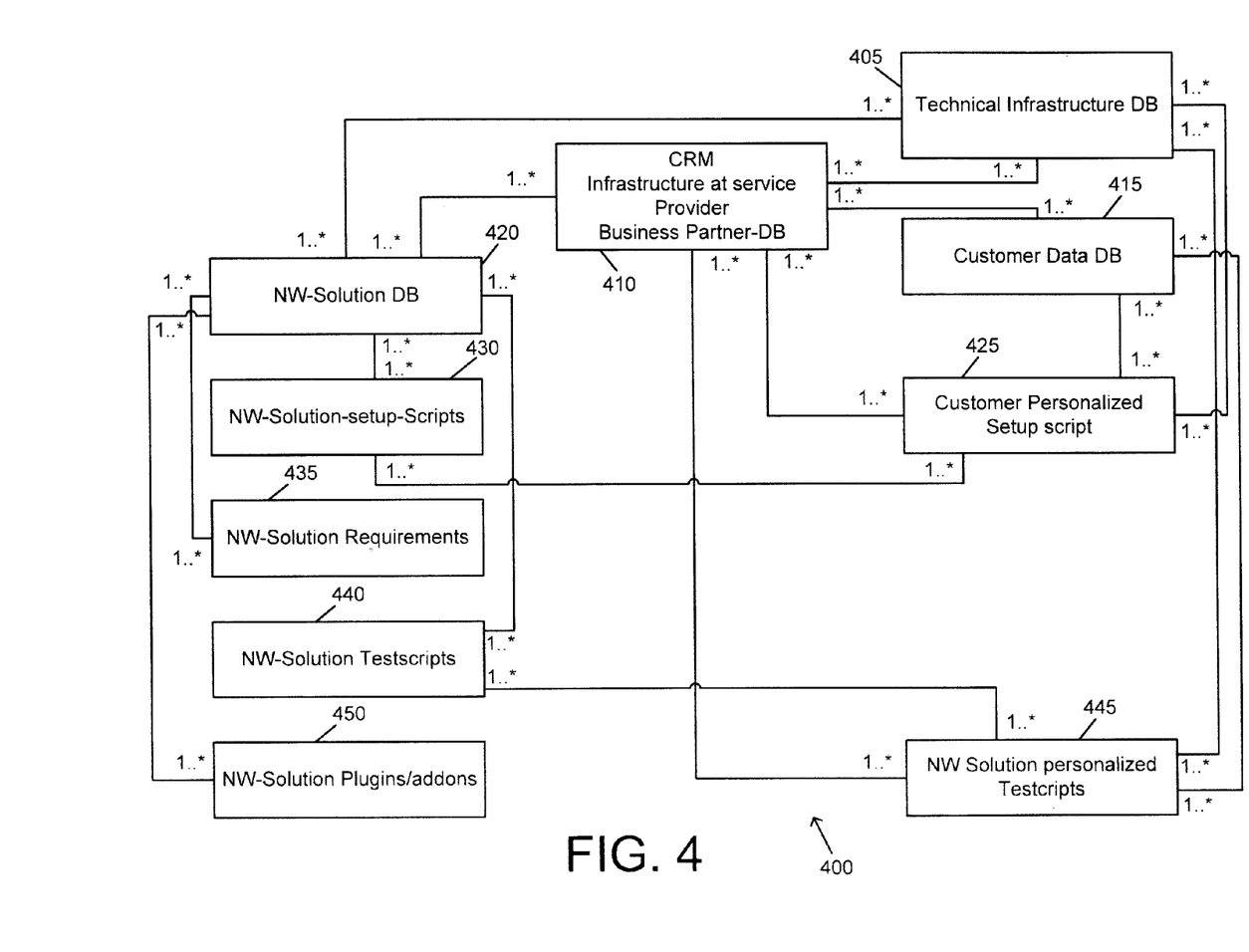
FIG. 4 is a sample data model for a distributed computing system with enhanced connectivity.

FIG. 4 is a diagram 400 illustrating a sample data model for executing the subject matter described herein (which in this case is illustrated in connection with a distributed software system implementing software by SAP AG). A CRM Infrastructure at Service Provider—Business partner DB component 410 is a database at the service provider 240 which can contain contractual data about the customer operating the client system 270 including, for example, name, contrast, solution implemented. A NW-Solution DB component 420 is a database which can contain technical data of a networked solution implemented by the distributed software system. A NW-solution setup-Scripts component 430 is a database which can contains scripts, which are necessary for the setup of a networked solution, both on client system 270 side and on the service provider side 270. A NW-solutions Requirements component 435 is a database which can contains information characterizing which data is required to use a networked solution. A NW Solution Testscripts 440 component is a database that can contain predefined testscripts for a networked solution. These scripts can be modified and adapted to check the validity of the business case of a networked solution. A NW Solution Plugin/addons component 445 is a database which can contain additional software necessary to adopt a networked solution to an existing ERP-System. A Technical Infrastructure DB component 405 is a service provider 240 side database that can contain data about the technical infrastructure at the service provider 240. This data can be used to personalize the service-provider-part and the customer part of setup scripts and test scripts. A Customer DB 415 is a service provider 240 side database that can contain data about the technical infrastructure at the client system 270. This data can be used to personalize the service-provider-part and the customer part of setup scripts and test scripts. A Customer personalized Setup Script component 425 is a database with setup-scripts which can be personalized with the customer's technical data. These scripts can be executed at the client system 270 and at the service provider 240 to automate the setup. A NW Solution personalized testscripts component 450 is a database with setup-scripts that can be personalized with the customer's technical data. These scripts can be executed at the client system 270 and at the service provider 240 to automate the testing of the entire solution.

The following provides an example in which a customer orders a networked solution application (i.e., an application which executes across the service provider 240 and the client system 270, etc.). During ordering, the customer enters the data which identifies: OP-Test-system, client, URL (which characterizes the client system test environment 280) and OP-Productive system, client, URL (which characterizes the client system production environment 290). In this context, "OP" refers to "on premise" which in turn refers to the computer environment located in the IT department of the end-user (e.g., client system 270). In addition, in this context "OD" refers to OnDemand, which in turn refers to a computer environment located in the IT department of the service provider 240 and such environment is operated by the IT-department of the service provider 240 (i.e., all technical processes such as monitoring, backup, upgrades and the like are handled by the service provider 240 as opposed to the user/customer). The service provider 240, at this point, sets up a customer tenant (i.e., a tenant in a multi-tenant cloud computing system such as SAP BYDESIGN, etc.) in which the tenant is copied from a default source. The service provider 240 then starts a program, which takes a generic script for the connectivity setup and inserts the data for the configuration of the connection OD-application to OP-Application. This program takes the script, which is written in a XML-schema, and replaces the predefined placeholders (hostnames, ports, system-name, tenant-name) for the OD-System, OD-Tenant and OD-router. This program also takes the script and replaces the predefined placeholders for the OP-System, OP-Tennant and OP-router. The script contains information to: (i) open the firewall of the service provider 240, (ii) generate the destinations to the client system 270, (iii) open the ports for required customer data. Thereafter, the service provider 270 starts the script.

A detailed log will be generated that details which activities have taken place and the results of such activities. The service provider 240 starts a program that takes a generic script for the connectivity setup and inserts the data for the configuration of the connection OP-application to OD-Application. This program takes the script, which is written in a XML-schema, and replaces the predefined placeholders for the OD-System, OD-Tenant and OD-router. This program also takes the script and replaces the predefined placeholders (hostnames, ports, system-name, tenant-name) for the OP-System, OP-Tennant and OP-router. The script contains information to: (i) generate the destinations to the client system 270, (ii) tunnel through the firewalls of the service provider 240, and (iii) open the ports for the required OD data. The service provider 240 sends this script and the execution infrastructure to the client system 270. The client system 270 gets the infrastructure and adds its information relating to the firewall/tunneling data. Thereafter, the client system 270 starts the script in test mode. This generates a detailed log, which actions will take place and which data are sent. The client system 270 starts the script in execution mode. The script asks the administrator of the client system 270 for each step, if the action performed in this step is valid. The administrator gets a detailed description, which are the prerequisites of this step and which are possible results. The execution of the script generates a detailed log.

In one use case scenario, a customer, after testing using a evaluation system, purchases access rights to a software platform enhancement from a service provider. The customer IT center opens its firewall and then creates users for the software platform enhancement. The service provider/host then generates a corresponding test environment and a production environment for the software platform enhancement. The users created by the customer IT center as well as other administrative and/or test users are installed in the test environment. A provisioning process then runs.

Customizing and scoping data from the evaluation system are transported into the test environment. The customer IT center imports relevant business process data, predefined customizing data for its part of the process, and predefined test data for this business process into its solution manager and obtains virtual system data from the service provider. The import automatically triggers the generation of a project in the solution manager together with the required logical components. Using the system data for the connectivity, the service provider assists the customer IT center to assign existing logical components or systems to this process. Using this data, the business process monitoring is automatically set up.

In the development environment, the customer IT center activates the predefined customizing data and transports it to the test-environment. There, predefined tests are started and the entire process is verified. After commitment from the customer defined users, the business process is set to "productive", the customizing data is transported to the productive environment and the connectivity is established between the productive systems at the provider. Later versions/enhancements to the software platform can be installed/incorporated in a similar manner.

Figure 5:
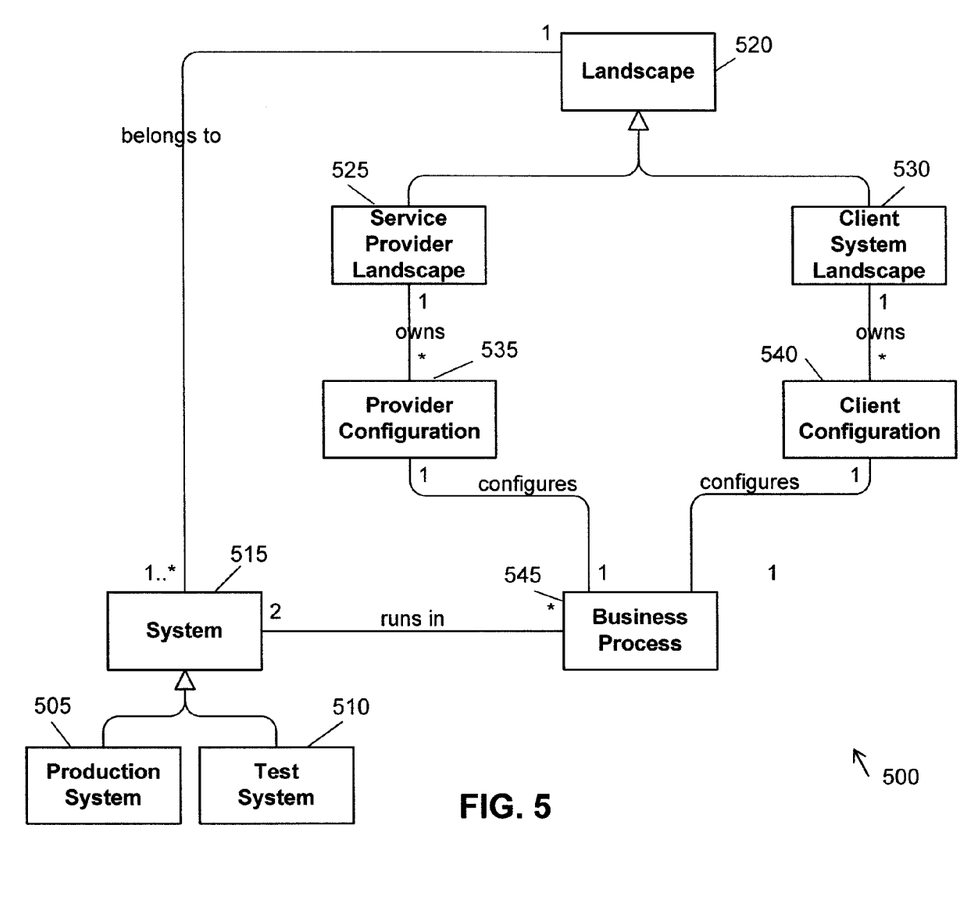
FIG. 5 is a diagram illustrating the relationship between the service provider and client system in relation to the business process.

FIG. 5 is a diagram 500 that illustrates the relationship between the client system and the service provider in relation to a business process 545. Two systems 515 which run the business process 545 specialize in either a pair of production systems 505 or test systems 510. The landscape 520 specializes in a service provider landscape 525 and a client system landscape 530. The service provider landscape 525 owns a provider configuration 535. Similarly, the client system landscape 530 owns a client configuration 540. Only the two configurations 535 and 540 together configure the business process 545.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer-implemented method comprising:
   initiating, at a service provider in a distributed software system in which configuration software settings are exchanged among interrelated software processes executing on both a client system and the system provider, generation of a test environment at the service provider for the client system, the test environment at the service provider being generated to interact with a test environment at the client system and to test a plurality of business processes before deployment, each test environment being respectively utilized by the service provider and the client system to test changes to a distributed software environment prior to the changes being made available to production environments at the service provider and at the client system;
   fetching, by the service provider, technical data associated with the test environment at the service provider from a remote database;
   receiving, by the service provider from the client system, test environment data;
   generating, by the service provider using the fetched technical data and the received test environment data, automation scripts for the service provider and the client system, the automation scripts respectively defining configuration settings for the service provider and the client system;
   executing, at the service provider, the automation scripts for the service provider;
   transmitting, by the service provider to the client system, the automation scripts for the client system; and
   initiate, at the service provider, testing of the test environment at the service provider and the test environment at the client system once the automation scripts have been executed on both the service provider and the client system.

2. A method as in claim 1, wherein the scripts executed on the client system is operated under the control of the service provider.

3. A method as in claim 1, wherein placeholders utilized by the test environment of the service provider and/or placeholders utilized by the test environment of the client system are replaced by the automation scripts.

4. A method as in claim 1, further comprising:
   transmitting, by the service provider to the client system, additional data complementary to the transmitted automation scripts.

5. A method as in claim 4, wherein the additional data comprises: one or more plug-in modules, business process information, and/or automated tests to execute in the test environment of the client system.

6. A method as in claim 5, wherein, upon initiation of the automation script by the client system, the client system checks requirements, installs plug-ins if needed, generates data destinations for the test environment of the client system, and/or automatically tests the generated data destinations.

7. A method as in claim 1, wherein the client system generates a log of actions that take place and data that is transmitted from the test environment of the client system to the test environment of the service provider.

8. A method as in claim 1, wherein the service provider generates a log of actions that take place and data that is transmitted from the test environment of the service provider to the test environment of the client system.

9. A method as in claim 1, further comprising:
   fetching, by the service provider, technical data from the client system.

10. A method as in claim 9, wherein the technical data fetched from the client system includes: firewall information, system identification, host information, and/or user information.

11. A method as in claim 1, wherein the automation scripts are XML schemas.

12. A system comprising:
    a service provider providing one or more networked software solutions, the service provider comprising one or more servers, each server including at least one data processor and memory;
    a client system remote from the service provider consuming the one or more networked software solutions of the service provider, the client system comprising one or more servers, each server including at least one data processor and memory;
    wherein:
        generation of a test environment is initiated at the service provider for the client system, the test environment at the service provider being generated to interact with a test environment at the client system and to test a plurality of business processes before deployment, each test environment being respectively utilized by the service provider and the client system to test changes to a distributed software environment prior to the changes being made available to production environments at the service provider and at the client system;

technical data associated with the test environment is fetched from a remote database by the service provider;

test environment data is received by the service provider from the client system;

automation scripts for the service provider and the client system are generated using the fetched technical data and the received test environment data, the automation scripts respectively defining configuration settings for the service provider and the client system;

the automation scripts for the service provider are executed;

the automation scripts are transmitted by the service provider to the client system; and testing of the test environment at the service provider and the test environment at the client system is initiated once the automation scripts have been executed on both the service provider and the client system.

13. A system as in claim 12, wherein the scripts executed on the client system is operated under the control of the service provider.

14. A system as in claim 12, wherein the service provider transmits additional data complementary to the transmitted automation scripts to the client system, the additional data including: one or more plug-in modules, business process information, and/or automated tests to execute in the test environment of the client system.

15. A system as in claim 14, wherein, upon initiation of the automation script by the client system, the client system checks requirements, installs plug-ins if needed, generates data destinations for the test environment of the client system, and/or automatically tests the generated data destinations.

16. A system as in claim 12, wherein the client system generates a log of actions that take place and data that is transmitted from the test environment of the client system to the test environment of the service provider; and
wherein the service provider generates a log of actions that take place and data that is transmitted from the test environment of the service provider to the test environment of the client system.

17. A system as in claim 12, wherein the service provider fetches technical data from the client system, the technical data comprising: firewall information, system identification, host information, and/or user information.

18. A system as in claim 12, wherein the automation scripts are XML schemas.

19. A system as in claim 12, further comprising at least one data processor executing a management infrastructure, the management infrastructure including a landscape directory for defining technical data regarding the service provider and landscape data defining technical data for the client system.

20. A non-transitory computer program product storing instructions which when executed by at least one data processor, result in operations comprising:

initiating, at a service provider in a distributed software system in which configuration software settings are exchanged among interrelated software processes executing on both a client system and the system provider, generation of a test environment at the service provider for the client system, the test environment at the service provider being generated to interact with a test environment at the client system and to test a plurality of business processes before deployment, each test environment being respectively utilized by the service provider and the client system to test changes to a distributed software environment prior to the changes being made available to production environments at the service provider and at the client system;

providing, at the service provider, the test environment at the service provider to enable the client system to access the test environment;

fetching, by the service provider, technical data associated with the test environment at the service provider from a remote database;

receiving, by the service provider from the client system, test environment data;

generating, by the service provider using the fetched technical data and the received test environment data, automation scripts for the service provider and the client system, the automation scripts respectively defining configuration settings for the service provider and the client system;

executing, at the service provider, the automation scripts for the service provider;

transmitting, by the service provider to the client system, the automation scripts for the client system to enable the automation scripts to be executed at the client system under the control of the service provider; and initiate, at the service provider, testing of the test environment at the service provider and the test environment at the client system once the automation scripts have been executed on both the service provider and the client system.

* * * * *